United States Patent [19]

Milligan et al.

[11] Patent Number: 5,273,565

[45] Date of Patent: Dec. 28, 1993

[54] MELTBLOWN FABRIC

[75] Inventors: Mancil W. Milligan, Knoxville; Robert R. Buntin, Baytown; Fumin Lu, Knoxville, all of Tenn.

[73] Assignee: Exxon Chemical Patents Inc., Linden, N.J.

[21] Appl. No.: 960,164

[22] Filed: Oct. 14, 1992

[51] Int. Cl.$^5$ .............................................. B01D 39/16
[52] U.S. Cl. ................................. 55/528; 55/DIG. 44
[58] Field of Search ...................... 55/527, 528, DIG.

[56] References Cited

U.S. PATENT DOCUMENTS

| | | | |
|---|---|---|---|
| 2,795,290 | 6/1957 | Butsch et al. | 55/527 X |
| 3,806,289 | 4/1974 | Schwarz | 425/72.2 |
| 3,959,421 | 5/1976 | Weber et al. | 264/6 |
| 3,978,185 | 8/1976 | Buntin et al. | 264/121 X |
| 4,215,682 | 8/1980 | Kubik et al. | 55/528 X |
| 4,594,202 | 6/1986 | Pall et al. | 264/8 |
| 4,818,463 | 4/1989 | Buehning | 264/40.1 |
| 4,824,451 | 4/1989 | Vogt et al. | 55/528 |
| 5,053,066 | 10/1991 | Hassenboehler | 55/528 X |
| 5,075,068 | 12/1991 | Milligan et al. | 264/115 X |
| 5,090,975 | 2/1992 | Requejo et al. | 55/528 X |
| 5,156,661 | 10/1992 | Adiletta | 55/528 X |

Primary Examiner—Robert Spitzer
Attorney, Agent, or Firm—R. W. Mulcahy

[57] ABSTRACT

A meltblown web is composed of fibers having a narrow fiber size distribution (expressed as % coefficient of variation of the average fiber diameter) and low packing density. The web is characterized as a soft lofty web and exhibits exceptional filtration capability. The web preferably comprises fibers having an average fiber size of between 3 and 10 microns and a packing density of between 5 to 15%, and a CV of 15 to 40%.

6 Claims, 5 Drawing Sheets

MELTBLOWN FABRIC

BACKGROUND OF THE INVENTION

This invention relates to novel meltblown webs with improved properties. In one aspect, the invention relates to a meltblown filter useful in filtration of gases such as air.

Meltblown nonwoven webs are made by the meltblowing process which involves extruding a thermoplastic resin through a row of closely spaced orifices to form a plurality of polymer filaments (or fibers) while converging sheets of high velocity hot air impart drag forces on the filaments and draw them down to microsized diameters. The microsized fibers are blown onto a collector screen or conveyor where they are entangled and collected, forming an integrated nonwoven web. The average diameter size of the fibers in the web range from about 0.5 to about 20 microns. Integrity or strength of the web depends upon the mechanical entanglement of the fibers as well as fiber bonding.

Meltblown webs are ideally suited for a variety of applications due to their microdenier fiber structure. Web properties which are important in these applications include:

(a) web bursting strength;
(b) packing density;
(c) web tenacity; and
(d) web elongation at break.

In addition, for filter applications the meltblown web should exhibit high filtration efficiency at reasonable air permeabilities.

As described in detail below, the present invention relates to a meltblown web which exhibits the properties mentioned above. The inventive web may be manufactured by a variety of processes, but the preferred process is by application of a cross-flow as described in U.S. Pat. No. 5,075,068.

References which disclose the application of some medium to the air/fiber stream of a meltblowing process upstream of the collector include U.S. Pat. Nos. 3,806,289, 3,957,421, 4,594,202, and 4,622,259. None of these references, however, disclose a meltblown web having the properties of the web of the present invention.

SUMMARY OF THE INVENTION

The meltblown web of the present invention exhibits unique properties which makes it ideally suited for a variety of uses, particularly filtration and absorbents. The web comprises microsized fibers exhibiting a more narrow fiber size distribution and an exceptionally low packing density in relation to conventional meltblown webs. (As used herein, the terms "fibers" and "fiber size" mean fibers and/or filaments and fiber diameter, respectively.) The present invention also contemplates the use of the novel web as a gas filter which exhibits relatively high air permeability.

In accordance with a broad embodiment of the invention, the web is composed of thermoplastic fibers having an effective average fiber size of between about 3–15 microns and a fiber size distribution (CV) of less than 40. The web is further characterized by low packing density of less than 20%, preferably of 15% or less.

In a preferred embodiment the web of the present invention exhibits a bursting strength of above 50 KPa, preferably above 60 KPa. The web also exhibits good tenacity and elongation at break. All of these properties combine to enhance the utility of meltblown webs.

In a specific embodiment of the present invention, the web comprises a gas filter which exhibits high filtration efficiencies at good air permeabilities.

DESCRIPTION OF THE PREFERRED EMBODIMENTS

The meltblown web of the present invention can be manufactured by the process and apparatus described in U.S. Pat. No. 5,075,068, the disclosure of which is incorporated herein by reference.

Figure 1:
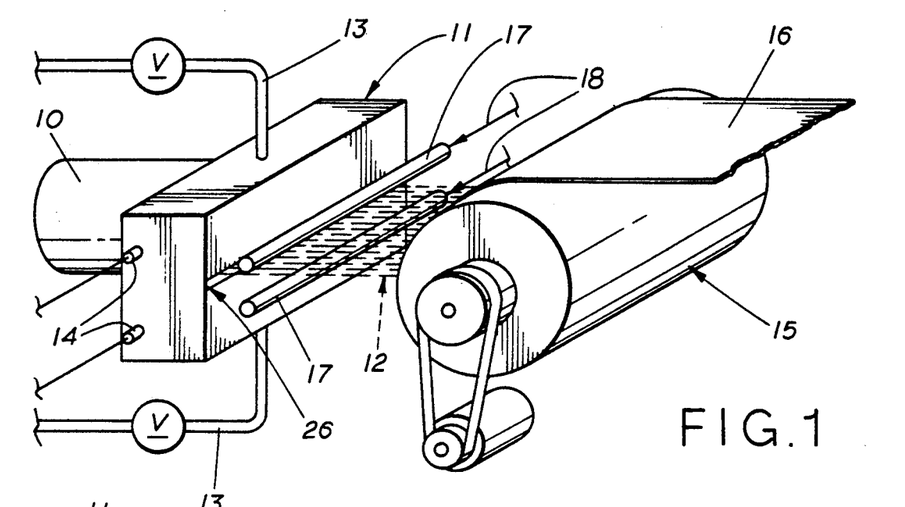
FIG. 1 is a perspective view of a meltblowing apparatus capable of manufacturing the web of the present invention.
Figure 2:
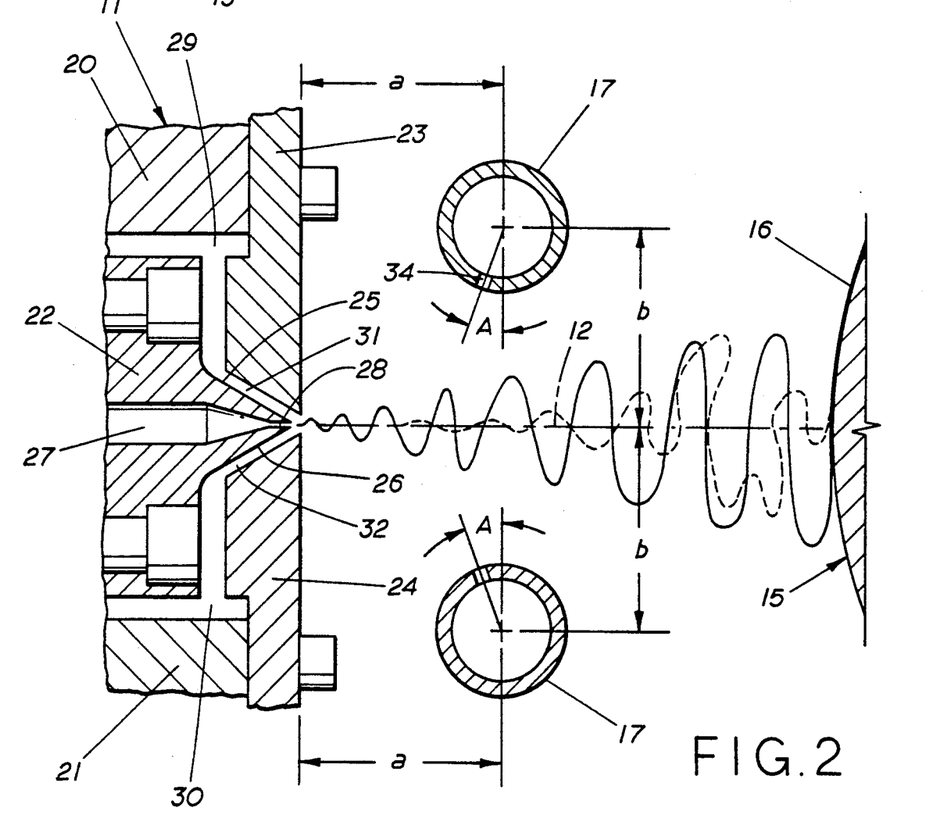
FIG. 2 is an enlarged side elevation of the meltblowing apparatus of FIG. 1.

As shown in FIGS. 1 and 2, a meltblowing line comprises an extruder 10 for delivering a molten resin to a meltblowing die 11 which extrudes molten polymer filaments into converging hot air streams. The filaments/air stream is directed onto a collector or screen 15 where the filaments are collected in a random entanglement forming a web 16. The web 16 is withdrawn from the collector 15 and may be rolled for transport and storage. The meltblowing apparatus also includes heating elements 14 mounted in the die and an air source connected to the die 11 through valved inlets 13. The air is heated by means not shown.

As more specifically shown in FIG. 2, the meltblowing die 11 includes body members 20 and 21, an elongated nosepiece 22 secured to the die body 20, and air plates 23 and 24. The nosepiece 22 has a converging die tip section 25 of triangular cross section terminating at tip 26. A central elongate passage 27 is formed in the nosepiece 22 and a plurality of side-by-side orifices 28 are drilled in the tip 26. The orifices generally are between 100 and 1200 microns in diameter and are spaced close together.

The air plates 23 and 24 with the body members 20 and 21 define air passages 29 and 30. The air plates 23 and 24 have tapered inwardly facing surfaces which in combination with the tapered surfaces of the nosepiece 25 define converging air passages 31 and 32. As illustrated, the flow area of each air passage 31 and 32 is adjustable. Molten polymer is delivered from the extruder 10 through the die passages (not shown) to passage 27, and extruded through the orifices 28 as discharging microsized, side-by-side filaments. Primary air is delivered from an air source via lines 13 through the air passages and is discharged onto opposite sides of the molten filaments as converging sheets of hot air. The converging sheets of hot air impart drag forces on the filaments to draw or attenuate them in the direction of filament discharge from the orifices 28. The orientation of the orifices (i.e., their axes) determine the direction of filament discharge and determine the angle of contact of primary air on the filaments. The angle of contact is between 22.5 and 45. The included angle of the nosepiece 25 ranges from about 45 to 90 degrees. It is important to observe that the above description of the meltblowing line is by way of illustration only. Other meltblowing lines may be used in combination with the cross-flow air facilities described below.

The meltblowing die described above may be provided with air conduits 17 which serve to deliver crossflow air through slots 34 onto the extruded filaments 12. The use of the crossflow air produces a unique meltblown nonwoven web which is characterized by low packing density (high loft), high bursting strength, narrow fiber size distribution, and high air permeability for a given average diameter size of the fibers. These properties are important in a number of applications of meltblown webs as will be described in detail below.

The reasons for the unique properties of the meltblown web of the present invention are not fully understood, but it is believed to be due in part to the increased drag resulting from the crossflow air which increases fiber draw-down, reducing the fiber size and fiber size distribution of the web. The mechanisms involved in crossflow air contacting the extruded filaments are described in detail in U.S. Pat. No. 5,075,068.

Although the web of the present invention can be made by meltblowing with crossflow air, it is to be emphasized that the inventive web is not restricted to any particular type of manufacture. Other processes may be controlled or developed which produces webs having the unique properties of the present invention. The novelty of the invention resides in the structure and properties of the web. The web of the present invention is thus characterized by reduced fiber size distribution, decreased packing density (i.e. loftier), and increased filtration efficiency for a given air permeability. Each of these properties is discussed below.

Figure 3:
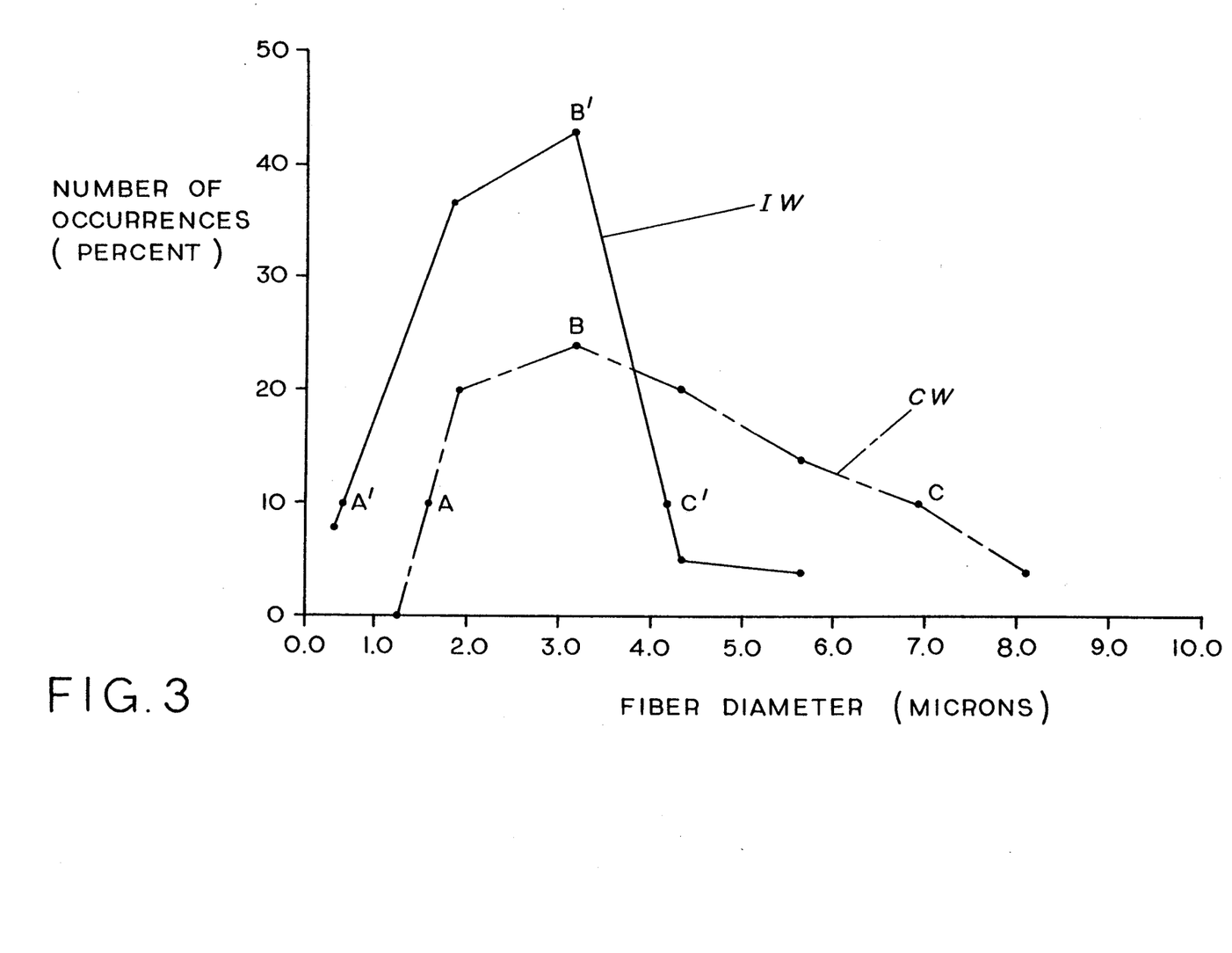
FIG. 3 is a plot comparing the fiber size (diameter) distribution of a conventional meltblown web with that of a meltblown web of the present invention.

Narrow Fiber Size Distribution: The plots of FIG. 3 compare the fiber size diameter of a conventional meltblown web with those of the meltblown web of the present invention. Note the envelope defined by A', B', C' is much narrower (ranging from about 0.9 microns to about 4.2 microns) than the envelope defined by A, B, C for the conventional web (ranging from about 1.5 microns to about 6.9 microns). The narrow fiber size distribution of the web of the present invention results in a much more uniform web.

The fiber size data shown in FIG. 3 were optically measured. The average fiber size data shown in FIGS. 4-11 were calculated (rather than measured) according to the equation from a literature by Benjamin Y. H. Liu and Kenneth L. Rubow $$\Delta P = \frac{a C u V g h}{D^2 K}$$

Where

C is packing density (Weight of web/Volume of web/ density of PP)

D is the effective average fiber diameter u is air viscosity

V is air velocity through the web h is thickness of the web $\Delta P$ is the pressure drop (125 Pa)

K is hydrodynamic factor $(-0.5 \text{Ln} C - 0.75 + C - 0.25 C^2)$ a is a constant obtained from a sample of known diameter. In this case two SEM pictures of the baseline sample were taken and average fiber diameter were measured.

C values were obtained by weighing dry sample (DW) and wet sample (WW) soaked in isopropanol and drained for 30 seconds before weighing, then calculated by the equation $$C = ((WW/DW) \times 1.147 - 0.147)^{-1}$$

h values were evaluated using the equation
h = web basis weight/C/density of PP
Density of PP = 0.9012 (g/cm3)
Density of isopropanol = 0.7848 (g/cm3)

The average fiber size values based on optical measurement or calculation according to the above method correlate very well. However, the values of average fiber size presented in FIGS. 4-11 and those recited in the claims are based on the calculation method described above.

The fiber size distribution of a particular web can be quantified as coefficient of variation (CV) based on individual optical fiber size measurements.

CV is the standard deviation of the fibers as measured divided by the average fiber size of the sample. For conventional webs manufactured at a variety of conditions, (e.g. polymer throughput) the CV ranged from 46.5 to 60.4 percent. However, for the web of the present invention the CV manufactured at corresponding conditions ranged from 33.9 to 38 percent.

It should be noted that the characteristic curves of the meltblown web to the present invention and of conventional meltblown webs will be generally as shown in FIG. 3 depending upon the polymer used and the process conditions. Generally, the respective curves will have the same general shape at different values along the abscissa.

Packing Density: Packing density is an important property of meltblown webs because it is a measure of the loft or softness of the web. Experimental data discussed below also suggests that the packing density, along with fiber size uniformity, has an effect on air permeability.

Packing density, expressed herein as a %, is defined as the density of the web divided by the density of the thermoplastic material used in the extruder.

Figure 4:
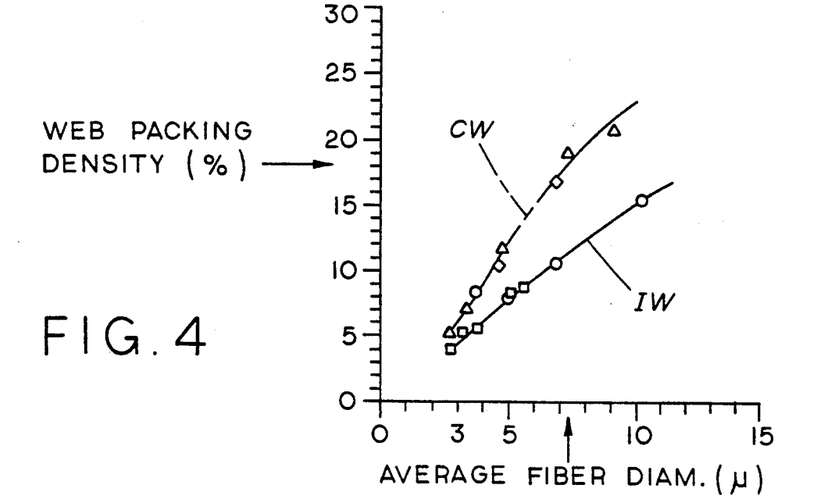
FIGS. 4, 5, and 6 are plots comparing the packing densities of the inventive web to those of a conventional web.
Figure 5:
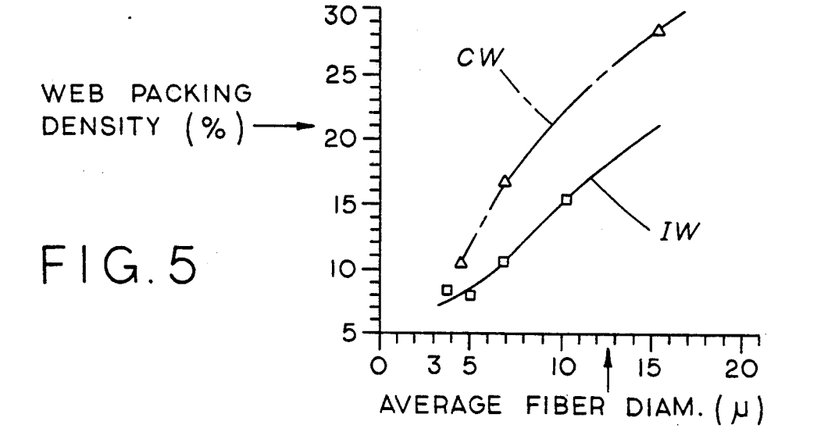
Figure 6:
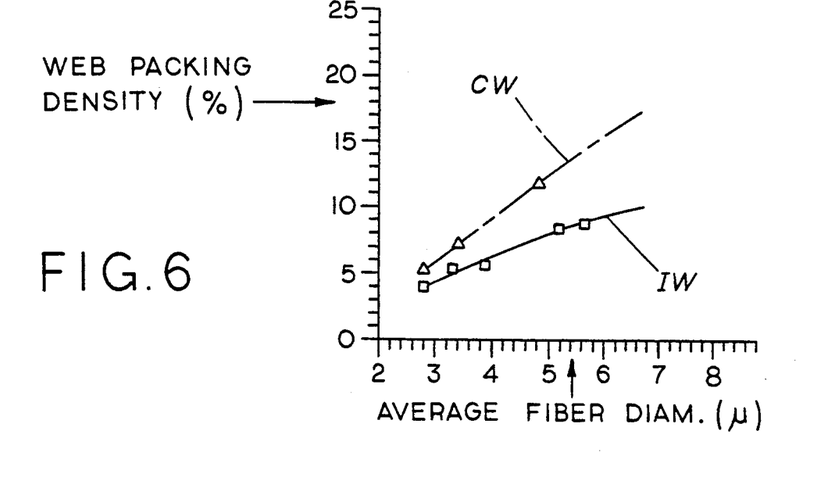

FIGS. 4, 5, and 6 present plots of packing density versus average fiber size diameter for the conventional webs and webs of the present invention at a variety of meltblowing conditions (described below under Experiments). Without exception, the packing density at corresponding average fiber size of the inventive web was less than that of conventional webs for average fiber size above 3 microns, the difference increasing with increased average fiber size. The packing density difference in the highly useful fiber size range (3 to 12 microns) and the most preferred range (3-10 microns) is substantial.

As can be seen by the plots in FIGS. 4, 5, and 6, the packing density varies depending on the meltblowing conditions. There is an overlap of the values of the packing density for the inventive web and a conventional web. However, when a performance parameter defined as the ratio of the packing density to the average fiber size, there is no overlap—the web of the present invention is surprisingly different, as demonstrated by the data of Table I:

TABLE I

| | Inventive Web | | | Conventional Web | | |
|---|---|---|---|---|---|---|
| | Packing Density (a) | Avg. Fiber D (b) | Ratio (a)/(b) | Packing Density (a) | Avg. Fiber Size (b) | Ratio (a)/(b) |
| FIG. 4 | 15 | 11 | 1.36 | 17 | 7 | 2.43 |
| Data | 11 | 7 | 1.57 | 10.5 | 5 | 2.10 |
| | 6 | 4 | 1.50 | 7 | 3.5 | 2.00 |
| FIG. 5 | 15 | 11 | 1.36 | 17 | 7 | 2.43 |
| Data | 11 | 7 | 1.57 | 11 | 4.5 | 2.44 |
| | 8 | 5 | 1.60 | — | — | — |
| FIG. 6 | 9 | 5.8 | 1.55 | 12 | 5 | 2.40 |
| Data | 8 | 5.2 | 1.54 | 7 | 3.4 | 2.10 |
| | 6 | 4 | 1.50 | — | — | — |

As reflected by the Table I data, the ratios of the inventive web within the range of fiber size greater than 3 microns is less than 2 whereas the ratios for conventional webs at corresponding sizes are 2.0 or greater. The preferred ratio is less than 1.9 and the most preferred range is less than 1.75, with the lower value of the range being 1.0, preferable 1.2, and most preferably 1.3.

The less dense webs of the present invention result in a thicker, softer web at the same basis weight.

Figure 7:
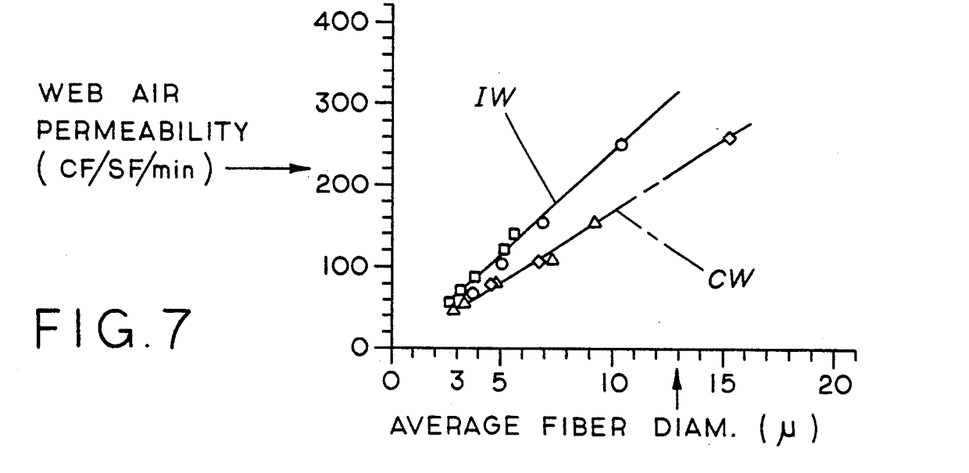
FIGS. 7, 8, and 9 are plots comparing web air permeabilities of the web of the present invention with those of conventional webs.
Figure 8:
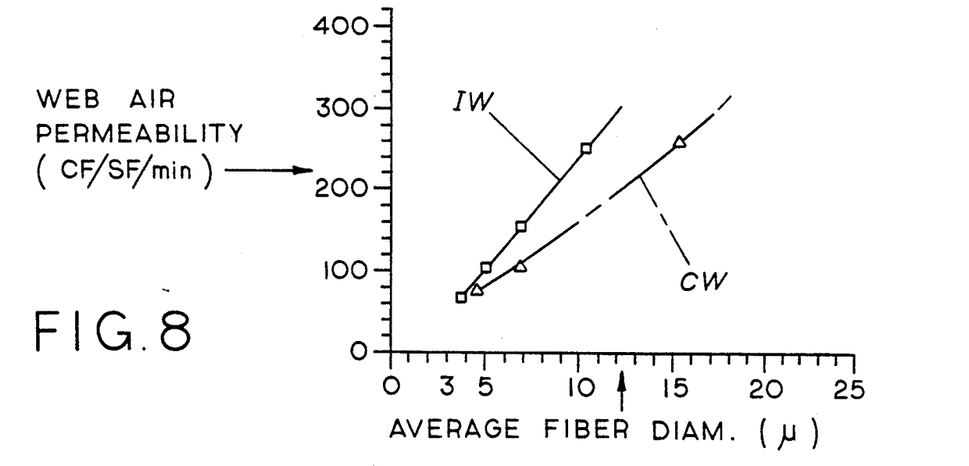
Figure 9:
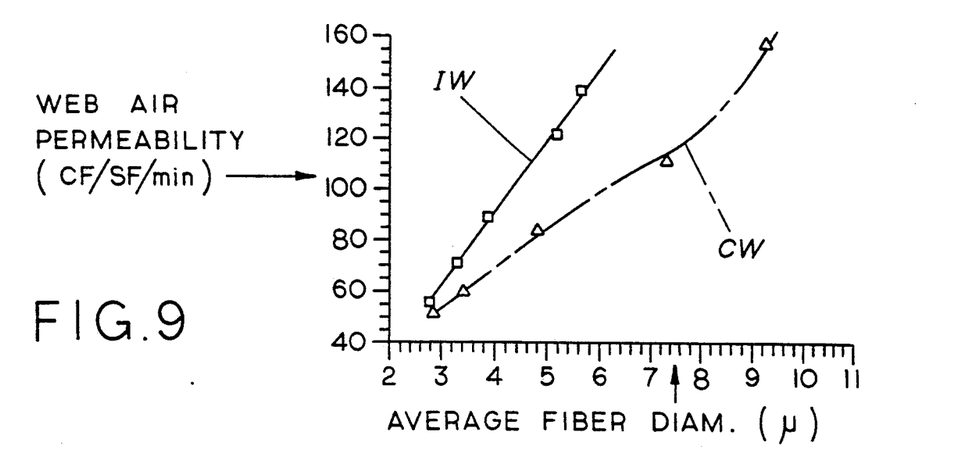
Figure 10:
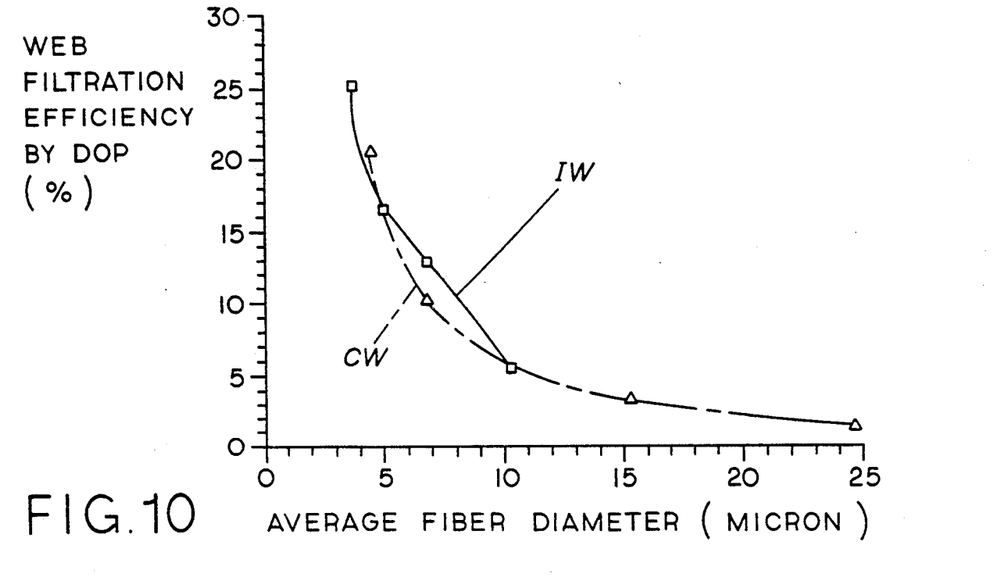
FIG. 10 is a plot showing web filtration efficiency vs. fiber diameter of meltblown webs.
Figure 11:
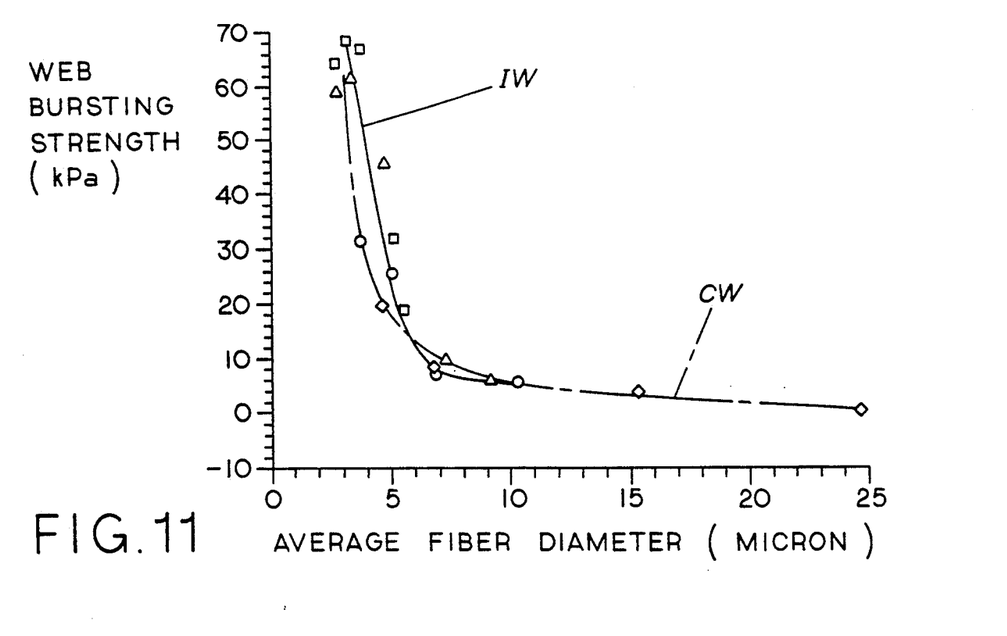
FIG. 11 is a plot showing the relationship of bursting strength and fiber size average diameter.

Air Permeability: A surprising and important property of the web of the present invention is its air permeability. It is known that web filtration efficiency (defined under Experiments) is a function of fiber diameter. FIG. 10 demonstrates that the filtration efficiency (F.E.) of the inventive webs and conventional webs are about the same for a given average fiber size. (F.E. is defined below under EXPERIMENTS). However, the data graphically illustrated in FIGS. 7, 8, and 9 show that for a given average fiber size within the range of interest (>3–15 microns) the air permeability of the web of the present invention is substantially higher, particularly in the preferred (3–12 microns) and most preferred (>3–10 microns) fiber size ranges. Higher air permeability, of course, translates into more air throughput or less pressure drop for a given F.E.

As with the property of packing density, there is an overlap of air permeabilities between the inventive web and the conventional web. Here again, by comparing the ratio of air permeabilities to average fiber size, the difference in air permeability performance is quite apparent. (See Table II).

TABLE II

| | Inventive Web | | | Conventional Web | | |
|---|---|---|---|---|---|---|
| | Air Perm. (a) | Avg. Fiber D (b) | Ratio (a)/(b) | Air Perm (a) | Avg. Fiber Size (b) | Ratio (a)/(b) |
| FIG. 7 | 260 | 10.5 | 24.8 | 260 | 15 | 17.3 |
| Data | 240 | 11 | 21.8 | 160 | 9.5 | 16.8 |
| | 110 | 5 | 22.0 | | | |
| | 90 | 4 | 22.5 | 105 | 7 | 15.0 |
| FIG. 8 | 260 | 11 | 23.5 | 160 | 16 | 10.0 |
| Data | 160 | 7 | 22.9 | 105 | 7 | 15.0 |
| | 105 | 5 | 21.0 | 80 | 5 | 16.0 |
| FIG. 9 | 140 | 5.6 | 25.0 | 130 | 7.5 | 17.3 |
| Data | 122 | 5.4 | 22.6 | 85 | 5 | 17.0 |
| | 90 | 4 | 22.5 | 60 | 3.4 | 17.6 |
| | 70 | 3.4 | 20.6 | | | |

The Table II data indicates that the air permeability/fiber size ratio for the inventive web is substantially higher than that ratio for conventional webs.

Summary

The following compares the property ranges for the web of the present invention with those of the prior art conventional web:

| | | Inventive Web | | |
|---|---|---|---|---|
| | Prior Art Web | Broad Range | Preferred Range | Most Preferred Range |
| (a) Packing density (%) | 5–20 | 5–20 | 5–15 | 7–12 |
| (b) Avg. fiber size diameter (micro) | 3–20 | 3–15 | >3–12 | 3–10 |
| (c) Ratio (a)/(b) | 2.1–2-5* | 1.2–2.0 | 1.25–1.9 | 1.3–1.75 |
| (d) CV, % | 45–60 | 10–40 | 15–40 | 30–40 |
| (e) Air Perm. CFM/FT² | 50–260 | 50–300 | 70–260 | 120–250 |
| (f) Ratio (e)/(b) | 10–17* | 20–30 | 21–28 | 22–27 |

*For the avg. fiber size diameter range claimed

Other Properties

It is preferred that the web of the present invention also have the following properties:

| | Preferred | Most Preferred |
|---|---|---|
| Bursting strength (kPa) (ASTM 3786-80) | above 50 | 60–100 |
| Elongation-at-break (%) (ASTM D 1682) | 10–25 | 14–20 |
| Tenacity (mN/tex) | 10–20 | 12–16 |

Tests have shown that the three properties (i.e. bursting strength, elongation and tenacity) described above for the inventive web are superior to conventional webs at comparable average fiber sizes.

The combination of the unique properties distinguish the meltblown web of the present invention over the conventional webs, enhance their utility, and expand their usefulness to other applications not commonly associated with conventional meltblown webs.

MANUFACTURE OF THE MELTBLOWN WEB OF THE PRESENT INVENTION

As noted above, the web of the present invention may be manufactured by the process and apparatus disclosed in U.S. Pat. No. 5,075,068. In such manufacture, the conduits 17, connected to air sources 18, are placed over and/or under the die outlet and adjusted to the desired "a", "b", and angle "A" settings. The meltblowing line is operated to achieve steady state operations. The crossflow air is then delivered to the conduits 17 by a conventional compressor at the desired pressure. Some minor adjustments may be necessary to achieve optimum results. The conduits are preferably sized to provide crossflow air of at least 200 fps and most preferably between 300 and 1200 fps.

It is important to note that the air conduits may be added to on any meltblowing die. For example, the die may be as disclosed in U.S. Pat. No. 4,818,463 or U.S. Pat. No. 3,978,185, the disclosures of which are incorporated herein by reference.

The web of the present invention may be manufactured from a variety of thermoplastics, including polyolefins such as ethylene and propylene homopolymers, copolymers, terpolymers, etc. Other suitable materials include polyesters such as poly(methylmethacrylate) and poly(ethylene terephthate). Also suitable are polyamides such as poly(hexamethylene adipamide), poly(omegacaproamide), and poly(hexamethylene sebacamide). Also suitable are polyvinyls such as polystyrene and ethylene acrylates including ethylene acrylic copolymers. The polyolefins are preferred. These include homopolymers and copolymers of the families of polypropylenes, polyethylenes, and other, higher polyolefins. The polyethylenes include LDPE, HDPE, LLDPE, and very low density polyethylene. Blends of the above thermoplastics may also be used. Any thermoplastic polymer capable of being spun into fine fibers by meltblowing may be used.

A broad range of process conditions may be used according to the process of the invention depending upon thermoplastic material chosen and the type of web/product properties needed. Any operating temperature of the thermoplastic material is acceptable so long as the materials are extruded from the die so as to form a nonwoven product. An acceptable range of temperature for the thermoplastic material in the die, and consequently the approximate temperature of the diehead around the material is 350 to 900 degrees Fahrenheit. A preferred range is 400 to 750 degrees Fahrenheit. For polypropylene, a highly preferred range is 400 to 650 degrees Fahrenheit.

Any operating temperature of the air is acceptable so long as it permits production of useable nonwoven product. An acceptable range is 250 to 900 degrees Fahrenheit.

The flow rates of thermoplastic and primary air may vary greatly depending on the thermoplastic material extruded, the distance of the die from the collector (typically 6 to 18 inches), and the temperature employed. An acceptable range of the ratio of pounds of primary air to pounds of polymer is about 15–500, more commonly 15–100 for polypropylene. Typical polymer flow rates vary from about 0.3 to 5.0 grams/hole/minute, preferably about 0.3–1.5.

The following experiments compare the web of the present invention over conventional webs and demonstrate the improved properties.

EXPERIMENTS

Series I: Experiments were carried out using a one-inch extruder with a standard polypropylene screw and a die having the following description:

| | |
|---|---|
| No. of orifices | 1 |
| Orifice size (d) | 0.015 inches |
| Nosepiece included angle | 60 degrees |
| Orifice land length | 0.12 inches |
| Air slots (defined by air plates) | 2 mm opening and 2 mm neg. set back |

Other test equipment used in Series I Experiments included an air conduit semicircular in shape and having one longitudinal slot formed in the flat side thereof. The air conduits in the other Experiment were in the form of slotted pipes 1 inch in diameter.

The resin and operating conditions were as follows:

| | |
|---|---|
| Resin | 800 MFR PP (EXXON Grade 3495G) |
| Die Temperature | 430 degrees Fahrenheit |
| Melt Temperature | 430 degrees Fahrenheit |
| Primary Air Temperature | 460 degrees Fahrenheit |
| Primary Air Rate | 16.5 SCFM per inch of die width |
| Polymer Rate | 0.8 gms/min. |
| Slot opening | 0.030 inches |
| Web collector | Screen 12 inches from the die |

The "a", "b", and angle "A" values (see U.S. Pat. No. 5,075,068) for the tests of this series were 1", 1-½", and +30 degrees, respectively. Other experiments were carried out with a multiple hole die as described below. The data in FIG. 3 are based on Series I tests.

Series II

Other experiments were carried out using a multiorifice die. The die was 28 inches wide with a 20 inch width of die orifices, having a total of 501 holes. The diameter of the orifices was 0.38 mm with L/D equal to 10. The air gap and die tip setback were 0.20 cm. It is worth noting that the 20 inch die resembles commercial ones in geometry and orifice dimensions and is also similar to that of the single-hole die in our lab. For these studies a crossflow device was constructed with a slit of 24 inch length and 0.08 cm width cut into a pipe of 0.5 inch OD.

The data in FIGS. 4, 5, 6, 7, 8, 9, 10 and 11 are based on Series II tests.

Experiment Design

Commercial Exxon homopolypropylene 800 MFR resin was used. A study of the variables "a", "b", and "A" along with primary air velocity and crossflow velocity was first conducted to determine duration of the crossflow slit with respect to the 20 inch die face. Samples were then processed and collected under the same conditions but without and with crossflow.

Sample Preparation and Property Measurements

Processing conditions used in this study are listed below:
(a) Melt temperature (265 degrees Centigrade)
(b) Primary air temperature (271 degrees Centigrade)
(c) Primary air velocity (M/S) - 100–290
(d) Crossflow air velocity (M/S) - 70–140
(e) Throughput (gm/min/h) - 0.1–2.0
(f) DCD (CM) - 15–25
(g) Basis wt. (gm/M$^2$) - 30–40

It should be noted that each web made without crossflow was followed by one taken with crossflow so that the pair of webs thus obtained had the same processing conditions except for the crossflow.

Filtration efficiency (F.E.) was determined using a TSI Automated Filter Tester Model 8110 with 0.101 milligrams of DOP (dioctyl phthalate) per in$^3$ of air as the source of 0.2 micron diameter particles. An air flow rate of 24 liters per minute was used which results in a velocity, at the face of the material, of 3.75 cm/sec.

A Frazier air permeability tester (Model 5138) was utilized to determine the air permeability (A.P.) according to ASTM Test Method D 737-75. The amount of air flow through a web at a pressure drop of 12.7 mm of water was determined.

The bursting strength, a measurement of the force required to rupture a web by a stress applied at right angle to the web, was performed on a Mullen Bursting Tester (Diaphragm type) according to ASTM Standard 3786-80a.

The tenacity and elongation-at-break were determined using a table model Instron tensile testing machine following procedures in ASTM Test Method D 1682.

Experimental Results

The data in FIG. 3 were based upon tests using a one-hole die. However, experiments indicate that the mechanisms of fiber formation in the meltblowing process of the multiple hole die are similar to those with the single hole die.

The webs used in the tests depicted in FIGS. 4, 5, 6, 7, 8, 9, 10 and 11 were prepared as follows using the multi-orifice die:

| | Air Velocity (m/s) | Polymer Throughput (g/Min.) |
|---|---|---|
| Resin - PP (Exxon Grade 3495G) Die Temp. 510 F. Primary Air Temp. 520 F. DCD - 10 inches | | |
| FIG. 4 | 100–250 | 0.1–1.2 |
| 5 | 100–250 | 0.8 |
| 6 | 185 | 0.1–1.2 |
| 7 | 100–250 | 0.1–1.2 |
| 8 | 100–250 | 0.8 |
| 9 | 185 | 0.1–1.2 |
| 10 | 100–250 | 0.8 |
| 11 | 100–250 | 0.1–1.2 |

Packing density versus average fiber diameter for both conventional meltblown webs and webs of the present invention are plotted in FIGS. 4, 5, and 6, and permeability versus fiber diameter are presented in FIGS. 7, 8, and 9. Note the divergence of the comparison plots as fiber diameter increases. FIG. 10 shows how filtration efficiency varies with effective Average Fiber Diameter.

What is claimed is:

1. A meltblown nonwoven web comprising randomly entangled fibers of a thermoplastic polymer and having the following properties:
   (a) an average fiber size diameter of 3.0 to 10 microns;
   (b) a coefficient of variation of the web fiber size diameter of 15 to 40%;
   (c) a packing density of 5 to 15%; and
   (d) a ratio of packing density to average fiber size diameter of 1.3 to 1.75.

2. The meltblown web of claim 1 wherein the packing density is between 7 and 12%.

3. The meltblown web of claim 1 wherein the thermoplastic is a homopolymer or a copolymer of a polyolefin.

4. A gas filter comprising a web of meltblown fibers as defined in claim 1 wherein the filter has a permeability to air of 50 to 300 $CFM/FT^2$ at a Basis Weight of 34 $gm/M^2$ or greater, wherein the air permeability is determined at a differential pressure across the web of 12.7 mm of $H_2O$.

5. The gas filter of claim 4 wherein the ratio of air permeability to average fiber size diameter ranges from 20 to 30.

6. The gas filter of claim 5 wherein the CV is between 30 and 40%.

* * * * *